May 8, 1962 J. M. LEWIS 3,033,468
PIPE COATING APPARATUS

Filed March 20, 1959 2 Sheets-Sheet 1

INVENTOR.
Jesse M. Lewis
BY
ATTORNEY

INVENTOR.
Jesse M. Lewis
BY
ATTORNEY

United States Patent Office 3,033,468
Patented May 8, 1962

3,033,468
PIPE COATING APPARATUS
Jesse M. Lewis, Tulsa, Okla., assignor to Allied Paint Manufacturing Company, Tulsa, Okla., a corporation of Delaware
Filed Mar. 20, 1959, Ser. No. 800,849
3 Claims. (Cl. 239—215)

This invention relates to improvements in pipe coating apparatus, and more particularly, but not by way of limitation, to an apparatus for applying a plastic coating to a pipe line, or the like.

Pipe lines usually extend over great distances for transporting fluids from the production site to the consumer. The fluids carried by the pipe line are often highly corrosive in nature, and it is desirable to coat the inner periphery of the pipe for protection therefrom. In addition, the elements of the atmosphere or ground surrounding the pipe line tend to attack the outer periphery thereof, thus making it desirable to coat the outer periphery as well as the inner periphery. Many types of coating materials have been utilized, such as tar materials, and the like. However, many of the materials have disadvantages in that an additional coating or wrapping of the pipe is necessary in order to provide an efficient covering of the pipe. Plastic resins have become more frequently utilized for coating the pipe and have been found more practical in that the plastic coating provides a hard protective coating which does not require the use of any additional wrapping of the pipe. However, the plastic resins have one particular disadvantage in that they must be mixed with a catalyst prior to application on the periphery of the pipe. The resin tends to harden or set up immediately upon coming into contact with the catalyst. Thus, the applicating equipment becomes clogged and often unusable in a relatively short time.

The present invention provides an apparatus for applying a plastic coating to either the inner or outer periphery of a pipe line or pipe section wherein the mixing of the catalyst and resin is accomplished in such a manner that the application equipment does not become coated or clogged throughout extended periods of usage. The catalyst and resin are mixed in motion and sprayed onto the pipe for an efficient coating thereof. The novel apparatus is simple and efficient in operation and economical and durable in construction.

It is an important object of this invention to provide an apparatus for applying a protective coating either to the inner or outer periphery of a pipe line, or the like.

It is another object of this invention to provide a novel apparatus for applying a plastic coating to the periphery of a pipe line in a manner whereby the coating apparatus may be utilized over an extended period of time with no clogging thereof.

Another object of this invention is to provide a novel apparatus for applying a plastic coating to a pipe line wherein the plastic resin and the catalyst therefor are mixed in motion to preclude hardening of the plastic material in the coating apparatus.

Still another object of this invention is to provide a coating apparatus for applying plastic material to the periphery of the pipe line which is simple and efficient in operation and economical and durable in construction.

Other objects and advantages of the invention will be evident from the following detailed description, read in conjunction with the accompanying drawings, which illustrate my invention.

Figure 1:
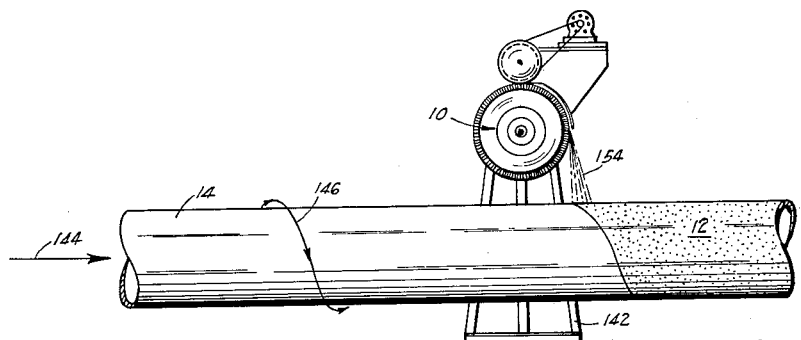
FIGURE 1 is a side elevational view of a pipe having the outer periphery thereof being coated by an apparatus embodying the invention.

Referring to the drawings in detail, reference character 10 refers in general to a pipe coating apparatus for applying a coating 12 to a pipe 14, or the like. The apparatus 10 comprises a main shaft 16 (FIG. 3) adapted for rotation by a suitable motor, or the like (not shown) in any well known manner. A circumferential shoulder 18 is provided on the shaft 16 for receiving an adaptor ring 20 thereagainst. The ring 20 is provided with an annular groove or recess portion for receiving a brush assembly 24 therein. An annular washer 26 is disposed around the shaft 16 adjacent the brush assembly 24 and cooperates with a nut 28 which is threadedly secured at 30 to the shaft 16 for urging the brush assembly 24 into a tight engagement with the adaptor ring 20. Thus, the brush assembly 24 is secured to the shaft 16 through frictional engagement between the washer 26 and the assembly 24 whereby the brush assembly 24 may be rotated simultaneously with the shaft 16.

The brush assembly 24 is preferably any suitable wire brush type assembly and normally comprises a spool or core portion 32 having a plurality of wire bristles 34 secured therein and extending radially outward therefrom, as clearly shown in the drawings. An annular plate member 36 is disposed between the brush assembly 24 and the washer 26 for controlling the quantity of air flowing into the bristles 34 for a purpose as will be hereinafter set forth. A similar annular plate 38 is disposed adjacent the bristles 34 oppositely from the plate 36 for cooperation therewith to control the flow of air through the brush assembly 24. It will be apparent from FIGS. 3 and 4 that the plates 36 and 38 are of a slightly smaller diameter than the brush 24 thus exposing the outer ends 40 of the bristles 34 as will be hereinafter set forth. The plate 36 is cut-away in FIG. 2 for purposes of illustration.

An applicator wheel or drum 42 is rotatably secured above the brush 24, as viewed in the drawings, whereby the outer periphery of the drum 42 is constantly in contact with the outer periphery of the bristles 34. The drum 42 is rigidly secured to a rotatable shaft 44 by a back plate 46 (FIG. 4) whereby the drum 42 may be rotated simultaneously with the shaft 44. A pulley or sprocket 48 is suitably secured to the shaft 44 and spaced from the drum 42 for transmitting rotation from a motor 50 to the shaft 44. The sprocket 48 receives an endless chain or belt 52 which extends from a drive pulley or sprocket 54 provided on the motor 50, thus transmitting torque to the pulley 48, and providing for the rotation of the shaft 44.

A sleeve member 56 (FIG. 4) is loosely disposed around the shaft 44 between the drum 42 and the sprocket 48, and is spaced from the shaft 44 by a plurality of spacer sleeves 58. The spacer sleeves 58 are preferably constructed from a suitable bearing material, such as an oil impregnated bronze, or the like, but not limited thereto, whereby the shaft 44 may rotate freely without transmitting rotation to the sleeve 56. An annular bearing ring 60 is disposed around the shaft 44 and interposed between the sleeve 56 and the pulley 48 to permit rotation of the sprocket 48 without rotation of the sleeve 56. Thus, the sleeve 56 remains stationary during the rotation of the shaft 44 and drum 42. A second bearing ring (not shown) may be interposed between the sleeve 56 and the plate 46 of the drum 42, if desired.

Figure 2:
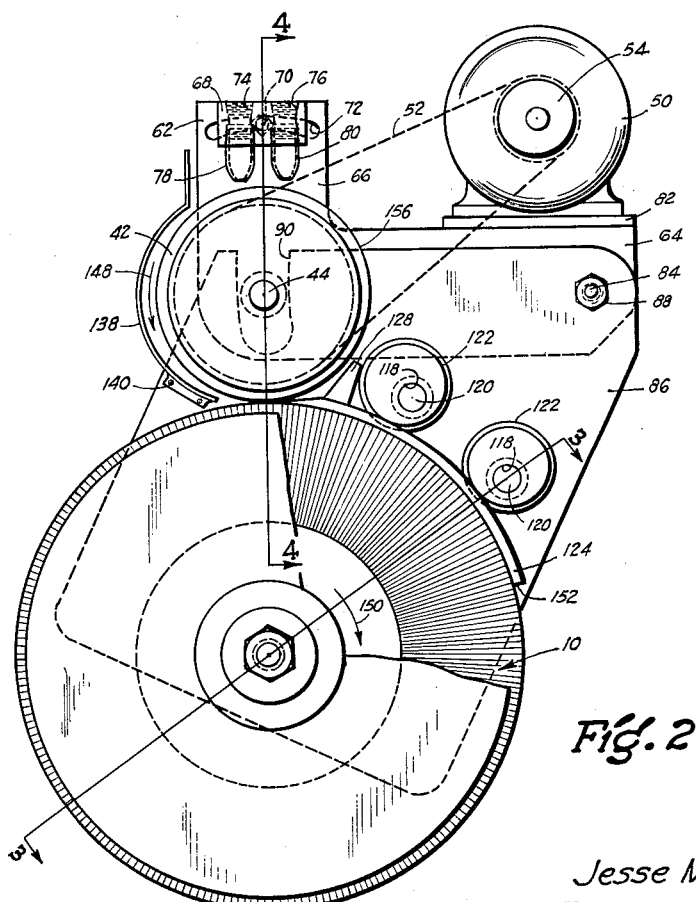
FIGURE 2 is an enlarged front elevational view of the coating apparatus with portions depicted in dotted lines for purposes of illustration.
Figure 4:
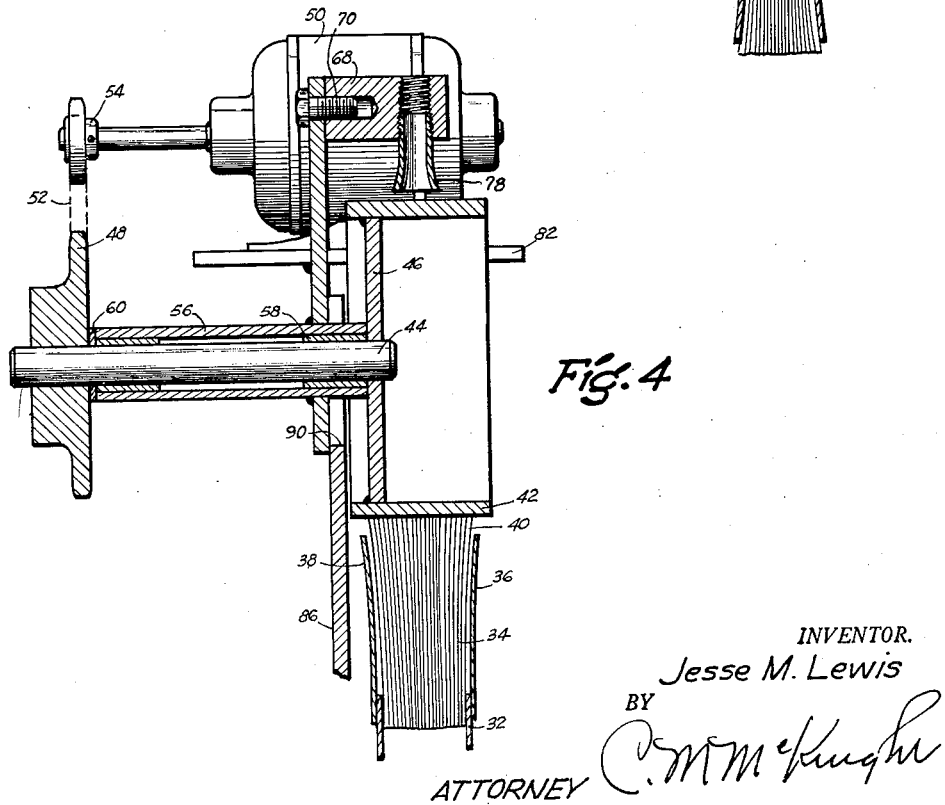
FIGURE 4 is a sectional view taken on line 4—4 of FIG. 2.

An angled plate member 62 is welded, or otherwise rigidly secured to the sleeve 56 and is spaced from the drum 42. The plate 62 comprises a substantially horizontal arm 64 (FIG. 2) and an upstanding arm 66 which extends above the outer periphery of the drum 42 for receiving a block member 68. The block 68 is adjustably secured to the plate 62 in any suitable manner, such as by the screw 70 which extends through an arcuate slot 72 provided in the upwardly extending arm 66. A pair of spaced threaded apertures 74 and 76 extend transversely through the block 68 for receiving a nozzle member 78 and 80 therein, respectively. The nozzles 78 and 80 are preferably tubular in configuration with the lowermost end portions thereof flattened in one direction, as shown in FIG. 2, and flared outwardly in the perpendicular direction thereto, as shown in FIG. 4, whereby a stream of fluid may be ejected therethrough onto the outer periphery of the drum 42 in a stream of substantially rectangular cross section wherein the longer dimension thereof is disposed longitudinally or axially of the drum 42. Thus, the fluid discharged through the nozzles 78 and 80 will effectively coat the outer periphery of the drum 42 disposed therebelow, as will be hereinafter set forth in detail.

A substantially horizontal support plate 82 is rigidly secured to the horizontal arm 64 by welding, or the like, for receiving the motor 50 thereon. The motor 50 is preferably a small motor since the torque required for the drum 42 is relatively small. The motor 50 may be bolted, or the like on the plate 82 for maintaining the distance between the pulleys 48 and 54 constant at all times during the operation of the apparatus 10.

The angled plate 62 is pivotally secured at 84 to a back plate member 86. A suitable lock nut 88 is provided for securely locking the plate 62 in the desired position with respect to the back plate 86 for a purpose as will be hereinafter set forth. The back plate 86 is provided with an inwardly or downwardly directed slotted portion 90 for receiving the shaft 44 and the sleeve 56 therethrough. It will be apparent that the slot 90 is slightly larger in width than the outer diameter of the sleeve 56 thereby permitting a universal adjustment of the shaft 44 and sleeve 56 in order to position the drum 42 as desired with respect to the bristles 34. The lock nut 88 may be loosened to permit adjustment of the angled plate 62 with respect to the back plate 86 for the proper positioning of the drum 42 whereby the outer periphery thereof will be in constant contact with the outer periphery of the bristles 34, as hereinbefore set forth. The nut 88 may be tightened in the usual manner for securely locking the plate 62 in the desired disposition.

Figure 3:
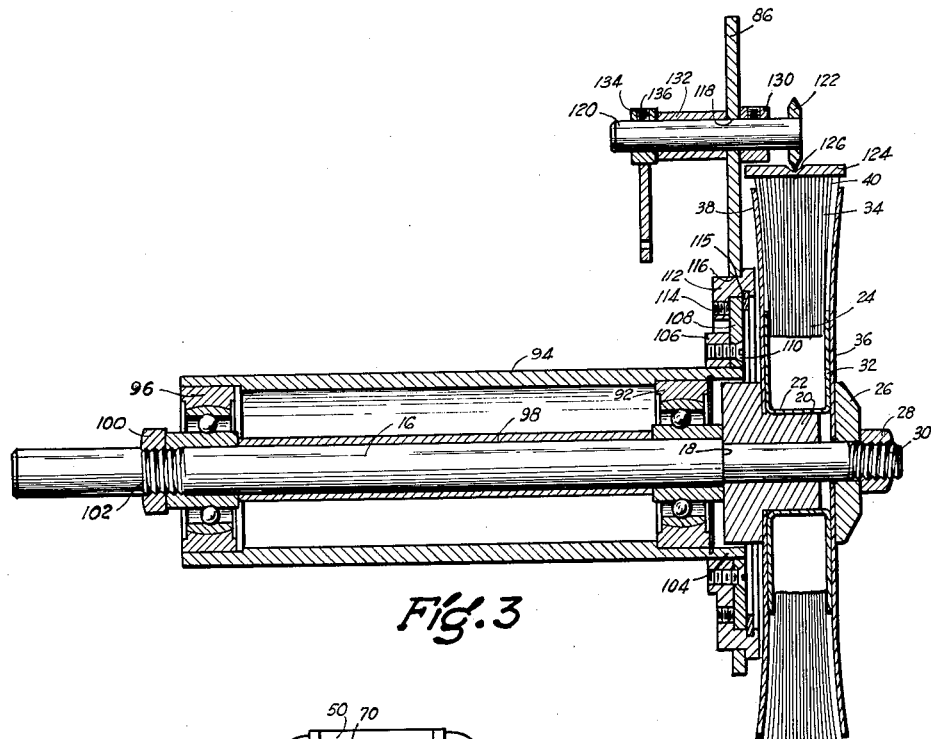
FIGURE 3 is a sectional view taken on line 3—3 of FIG. 2.

Referring to FIG. 3, a suitable roller bearing assembly 92 is disposed around the shaft 16 adjacent the sleeve 20 for supporting one end of a tubular housing 94. A second roller bearing assembly 96 is disposed around the shaft 16 for supporting the opposite end of the housing 94, and is spaced from the bearing 92 by a spacer sleeve 98. The bearing 96 is securely retained on the shaft 16 by a nut 100 which is threadedly secured to the shaft 16 at 102. The housing 94 is stationary and is so disposed around the shaft 16 that the right hand end 104 of the housing 94, as viewed in FIG. 3, exends slightly beyond the ring 20. It will be apparent that the inner diameter of the housing 94 is slightly larger than the outer diameter of the ring 20 in order that the ring 20 may rotate freely within the housing 94.

An annular ring 106 is welded, or the like, to the outer periphery of the housing 94 adjacent the end portion 104 thereof. An annular disc 108 is removably secured to the ring 106 by a plurality of screws 110, and is disposed adjacent the end 104 of the housing 94. A flanged sleeve member 112 is disposed around the disc 108 and is secured thereto by a plurality of set screws 114. A lock washer 115 is oppositely disposed from the set screws 114 for cooperation therewith to retain the sleeve 112 securely in position relative to the disc 108. The sleeve 112 is disposed in an aperture 116 provided in the back plate 86, and is welded, or the like, therein, thus securing the housing 94 and shaft 16 along with the brush assembly 24 to the back plate 86.

A plurality of apertures 118 are provided in the back plate 86 and are spaced from the outer periphery of the bristles 34 as clearly shown in FIGS. 2 and 3. A cam shaft 120 is suitably journalled in each of the apertures 118 for supporting a cam disc 122 in the proximity of the bristles 34. An arcuate plate or shoe 124 is disposed immediately adjacent the outer periphery of the bristles 34 and is constantly urged thereagainst by the cam members 122. The outer periphery of the cams 122 is preferably substantially V-shaped in configuration, as clearly shown in FIG. 3, and is adapted to rest in a V-shaped groove 126 which extends longitudinally throughout the length of the shoe 124. It will be apparent that the cams 122 and the groove 126 will cooperate to provide for a transverse pivotal movement or self-aligning of the shoe 124 in order that the inner periphery of the shoe 124 will be urged into close contact or engagement with the outer periphery of the bristles 34 even if the transverse surface thereof is not exactly parallel with the longitudinal axis of the brush assembly 24. A suitable upwardly extending stop member 128 is provided on the outer periphery of the shoe 124 for engaging the uppermost cam 122 in order to facilitate retaining the shoe in position adjacent the bristles 34 for a purpose as will be hereinafter set forth.

A set collar 130 (FIG. 3) is provided around the cam shaft 120 adjacent the back plate 86 for retaining the shaft 120 within the aperture 118. A sleeve member 132 is rigidly secured to the plate 86 and is oppositely disposed from the set collar 130 for receiving the shaft 120 therethrough. A lever arm 134 is secured to the shaft 120 by a plurality of set screws 136 for a purpose as will be hereinafter set forth. A suitable weight (not shown) may be suspended from the lever arm 134, if desired, for constantly urging the cam 122 into engagement with the groove 126.

A suitable guard plate 138 preferably of an arcuate configuration may be secured to the back plate 86 by a plurality of screws 140 and disposed adjacent the left hand side of the drum 42 as viewed in FIG. 1 for precluding undue splashing of the plastic coating fluid during the coating operation, as will be hereinafter set forth.

*Operation*

The coating apparatus 10 may be utilized for coating either the inner or outer periphery of the pipe 14, as desired. The operation set forth herein relates particularly to the coating of the outer periphery of the pipe. However, it will be apparent that the coating apparatus 10 may be suspended from a boom, or the like, such, as disclosed in the Jesse M. Lewis Reissue Patent No. 24,601, issued February 17, 1959, and entitled "Method of Processing Pipes."

The coating apparatus 10 may be mounted in any suitable manner, such as on the stand 142 (FIG. 1), whereby the pipe 14 to be coated may be moved longitudinally with respect thereto. The pipe 14 is preferably moved in the direction indicated by the arrow 144, but not limited thereto, and is simultaneously rotated in any well known manner (not shown) whereby the outer periphery thereof will be coated in a spiral path, as indicated by the arrow 146, thus assuring an efficient coating of the pipe 14.

The resin material to be applied to the pipe 14 is normally in a liquid state, and is directed into the aperture 76 in any well known manner (not shown) for discharge through the nozzle 80 onto the outer periphery of the drum 42. The catalyst agent is usually in a liquid state, and is directed into the aperture 74 for discharge through the nozzle 78 onto the outer periphery of the drum 42 simultaneously with the discharging of the resin. The drum 42 is rotated in the direction indicated by the arrow 148 (FIG. 2) by the motor 50 at a relatively slow speed, such as approximately one hundred fifty revolutions per minute. The resin deposited on the outer periphery of the drum 42 is carried thereon until it moves under the nozzle 78. The catalyst discharged through the nozzle 78 is deposited over the resin, and the double layer of liquids is carried on the outer periphery of the drum 42 until the liquids are brought into contact with the bristles 34.

The brush assembly 24 is preferably rotated in the direction indicated by the arrow 150, and is rotated at a relatively high rate of speed, such as three thousand revolutions per minute, but not limited thereto. The double layer of liquids on the periphery of the drum 42 is picked up by the bristles 34 and carried thereon under the shoe 124, where the resin and catalyst components are mixed in motion during the scrubbing action of the bristles against the shoe. As the bristles 34 leave the outermost end 152 of the shoe 124, the mixture of catalyst and resin is sprayed onto the outer periphery of the pipe 14 in fine particles, as indicated at 154 (FIG. 1). The shroud plates 36 and 38 disposed adjacent the bristles 34 control the flow of air into the bristles due to the high centrifugal force created by the whirling brush, thereby precluding an excessive mixture of air with the plastic mixture.

The scrubbing action of the bristles 34 against the inner periphery of the shoe 124 maintains the shoe clean at all times and precludes any build up of hardened plastic material thereon. In addition, the mixing of the catalyst and resin in motion and substantially immediate spraying of the mixture onto the periphery of the pipe greatly reduces a pre-setting or hardening of the material prior to application thereof to the pipe. Thus, the apparatus 10 may be utilized for extended periods of time without the necessity of cleaning thereof, and no portions thereof can become clogged with the hardened plastic material. Furthermore, the right hand portion 156 of the periphery of the drum 42 as viewed in FIG. 2 disposed between the bristles 34 and the nozzle 80 is always clean due to the scrubbing action of the bristles 34 against the periphery of the drum 42 at the point of contact therebetween. Thus, the periphery of the drum 42 receiving the resin from the nozzle 80 will always be clean and free from any mixture of resin and catalyst.

The cam members 122 constantly urge the shoe 124 into a tight engagement with the brushes 34 to assure an efficient mixing of the resin and catalyst and scrubbing of the shoe. In the event that the inner periphery of the shoe becomes worn, the cams 122 automatically turn so that the larger portion thereof is disposed in the groove 126 for assuring a tight engagement between the brushes 34 and the shoe 124. As hereinbefore set forth, the outer periphery of the cams 122 cooperate with the V-shaped groove 126 for permitting a transverse pivotal movement of the shoe to compensate for any unevenness or out-of-levelness of the outer periphery of the brushes. When it is desired to remove the shoe from the bristles 34 for any reason, the lever 134 may be manually moved to an upwardly extending position for rotation of the shaft 120 and the cams 122 to a position wherein the outer periphery of the cams is removed from disposition in the groove 126, thereby permitting the removal of the shoe 124 for repair or replacement.

The shoe 124 may be provided with any suitable type of cooling system (not shown), such as water, or the like, in order to preclude undue heating thereof from the friction between the bristles 34 and the inner periphery of the shoe at times when the brush is rotating without picking up the resin and catalyst liquids. However, the mixture of resin and catalyst on the bristles during the coating operation maintains a sufficient lubrication of the shoe 124 to preclude undue heating thereof.

It will be apparent that the catalyst and resin may be interchanged whereby the catalyst is discharged through the nozzle 80 and the resin is discharged through the nozzle 78 to provide the same efficient results of coating of the pipe 14.

By way of summary, the resin and catalyst deposited on the outer periphery of the drum 42 is picked up by the bristles 34 for mixing thereof under the shoes 124. The mixing in motion of the resin and catalyst substantially precludes hardening of the plastic mixture prior to disposition thereof on the periphery of the pipe 14. The plastic mixture is sprayed onto the periphery of the pipe to assure an efficient coating thereof. In addition, the scrubbing action of the brush or bristles against the shoe, as well as the drum 42, precludes any build up of the plastic material on the apparatus 10 to provide for an efficient utilization thereof throughout extended periods of time. It has been found that by permitting the brush 24 to rotate through a few revolutions after stopping the flow of the resin and catalyst efficiently cleans the shoe and the drum, thereby eliminating the necessity of cleaning the apparatus 10 after usage thereof.

From the foregoing, it will be apparent that the present invention provides a novel apparatus for coating both the inner and outer periphery of a pipe with a plastic material wherein pre-hardening or pre-setting of the plastic material prior to disposition thereof on the pipe is substantially eliminated. The novel apparatus is particularly designed and constructed for mixing the catalyst and resin in motion whereby the coating apparatus is maintained clean at all times, thereby greatly reducing the maintenance thereof and prolonging the useful life thereof. The novel apparatus is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An apparatus for applying a coating material to a pipe comprising a rotatable drum, nozzle means provided for applying separate components of the coating material to the outer periphery of the drum, rotatable brush means disposed in contact with the outer periphery of the drum for receiving the separate components therefrom, an arcuate shoe disposed adjacent the outer periphery of the brush, weight actuated cam means constantly urging the shoe into a tight engagement with the brush to provide for mixing the components in motion, means providing for self-aligning of the shoe with respect to the outer periphery of the brush, means cooperating with the brush for controlling the flow of air therethrough, said shoe and brush cooperating for spraying the mixture onto the pipe.

2. An apparatus for applying a coating material to a pipe comprising a rotatable drum, nozzle means provided for applying separate components of the coating material to the outer periphery of the drum, rotatable brush means disposed in contact with the outer periphery of the drum for receiving the separate components therefrom, an arcuate shoe disposed adjacent the outer periphery of the brush, means constantly urging the shoe into a tight engagement with the brush to provide for mixing the components in motion, means providing for self-aligning of the shoe with respect to the outer periphery of the brush, annular plates disposed against the sides of the brush for controlling the flow of air therethrough, said annual plates being of a slightly smaller diameter than said brush, said shoe and brush cooperating for spraying the mixture onto the pipe.

3. An apparatus for applying a coating material to a pipe comprising a rotatable drum, nozzle means provided for applying separate components of the coating material to the outer periphery of the drum, rotatable brush means disposed in contact with the outer periphery of the drum for receiving the separate components therefrom, an arcuate shoe disposed adjacent the outer periphery of the brush and extending from a point adjacent the drum, means constantly urging the shoe into a tight engagement with the brush to provide for mixing the components in motion, means providing for self-aligning of the shoe with respect to the outer periphery of the brush, means cooperating with the brush for controlling the flow of air therethrough, said shoe and brush cooperating for spraying the mixture onto the pipe.

References Cited in the file of this patent

UNITED STATES PATENTS

| | | |
|---|---|---|
| 435,878 | Dunton | Sept. 2, 1890 |
| 598,608 | Clark | Feb. 8, 1898 |
| 651,166 | Heinze | June 5, 1900 |
| 1,065,365 | Higgins | June 24, 1913 |
| 1,737,044 | Conley | Nov. 24, 1929 |
| 2,276,484 | Harshberger | Mar. 17, 1942 |
| 2,368,742 | Brend | Feb. 6, 1945 |